Patent Number: 4,541,116 — Sep. 10, 1985

United States Patent
Lougheed

[54] NEIGHBORHOOD IMAGE PROCESSING STAGE FOR IMPLEMENTING FILTERING OPERATIONS

[75] Inventor: Robert M. Lougheed, Ann Arbor, Mich.

[73] Assignee: Environmental Research Institute of MI, Ann Arbor, MI

[21] Appl. No.: 583,662

[22] Filed: Feb. 27, 1984

[51] Int. Cl.³ .............................................. G06K 9/36
[52] U.S. Cl. ......................................... 382/49; 382/54
[58] Field of Search ....................... 382/41, 49, 50, 52, 382/53, 54

[56] References Cited
U.S. PATENT DOCUMENTS

| | | | |
|---|---|---|---|
| 3,737,855 | 6/1973 | Cutaia | 382/50 |
| 4,003,024 | 1/1977 | Riganati et al. | 382/49 |
| 4,464,788 | 8/1984 | Sternberg et al. | 382/49 |

Primary Examiner—Leo H. Boudreau
Assistant Examiner—Michael M. Murray
Attorney, Agent, or Firm—Krass & Young

[57] ABSTRACT

A neighborhood transformation stage is designed to perform filtering operations on an image matrix. A group of pixel values in the image matrix are accessed. A series of comparators are used to compare the values of neighboring pixels with the value of a given pixel in the group. The outputs of the comparators are combined to form a vector to address a programmable look-up table. The addressed output of the look-up table is used as a control signal for a selector which either maintains the value of the given pixel or transforms it into another value associated with a neighboring pixel whose value has been ranked in a predetermined order by a rank sorter device used to compare the values of the neighboring pixels with each other.

10 Claims, 4 Drawing Figures

NEIGHBORHOOD IMAGE PROCESSING STAGE FOR IMPLEMENTING FILTERING OPERATIONS

DESCRIPTION

1. Technical Field

This invention relates to automatic image processing systems and, more particularly, to apparatus for filtering digital image matrices.

2. Background

The desire to separate and remove small light or dark regions in images is as old as image collection and display technology, extending even into the photographic realm. The term "noise" is often used to describe these regions, which are usually small clusters of picture elements (pixels) which are significantly different, either brighter or darker, than the other pixels around them. The causes of these spurious elements in an image are varied and often uncontrollable.

A variety of techniques have been used to solve this problem, including analysis of the statistical properties of the image and thresholding. Some other methods which have been used are based upon morphological operations of opening and closing (see e.g., J. Serra, *Image Analysis and Mathematical Morphology*, Academic Press, N.Y., N.Y. 1982.) Iterative filtering techniques using structuring elements as small as 2×2 have been used in connection with a series of opening and closing operations for the purpose of filtering noise from the image matrix. While extremely powerful, these iterative filters are often too coarse when one desires to remove isolated, small clusters of noise, such as a single pixel of noise.

To produce a smaller effect, a set of algorithms called "donut" filters have been developed. These operations remove isolated "spikes" (both positive and negative) by examining the magnitude relationship of each pixel to that of its immediate neighbors. While image processors utilizing parallel array architectures may be used to perform these donut filtering operations, in many cases it may be preferable to utilize serial neighborhood processing techniques using a raster subarray architecture. These types of image processors are used to transform image matrices which are fed in a raster scan line format to the input of one or more processing stages. Examples of image processors of this type are found in the disclosures in commonly assigned U.S. Pat. Nos. 4,167,728; 4,301,443; and 4,395,700 which are hereby incorporated by reference. Unfortunately, many of the donut filters (which will be described) are not easily implemented in the currently existing hardware of the image processors of this type.

SUMMARY OF THE INVENTION

The present invention is directed to improvements in a neighborhood transformation stage that includes neighborhood extraction means for accessing a group of pixel values in an image matrix fed serially from a data source. The stage is provided with comparator means for comparing the values of neighboring pixels with a value of a given pixel in the group. The comparison means provides a first output, preferably in the form of an eight-bit vector, as a function of the comparison. Sorting means are provided for comparing the values of the neighboring pixels with each other and ranking the values thereof in a predetermined order according to the relative values of the neighboring pixels. Selector means operates to select as its output the value of the given pixel, (i.e., no transform) or the value of a neighboring pixel ranked in a given position as a function of the output of the comparison means.

In the preferred embodiment, each group is a 3×3 neighborhood of pixels. The eight neighboring pixels are compared with the center pixel value, with the outputs from these comparators being combined to form an address to a programmable memory serving as a look-up table. The addressed output of the table is used as a control for the selector means. A rank sorter device compares the eight neighboring pixel values and provides a plurality of output lines, each containing one of the neighboring pixel values. The output lines are ranked in sequential order. A first subset of the output lines contains the upper four neighboring pixel values while a second subset contains the lower four neighboring pixel values. Second programmable means are provided for selecting an output line in each of the subsets. The second programmable means effectively serves as a mechanism for selecting the filter order number. Its output, along with that of the look-up table, is used by the selector means to determine the nature of the filtering operation to be performed on each of the accessed neighborhoods.

The stage construction of this invention enables a serial neighborhood processing stage to efficiently perform a wide variety of filtering operations as will become apparent after a study of the following specification and drawings.

DESCRIPTION OF THE PREFERRED EMBODIMENT

Figures 1, 2:
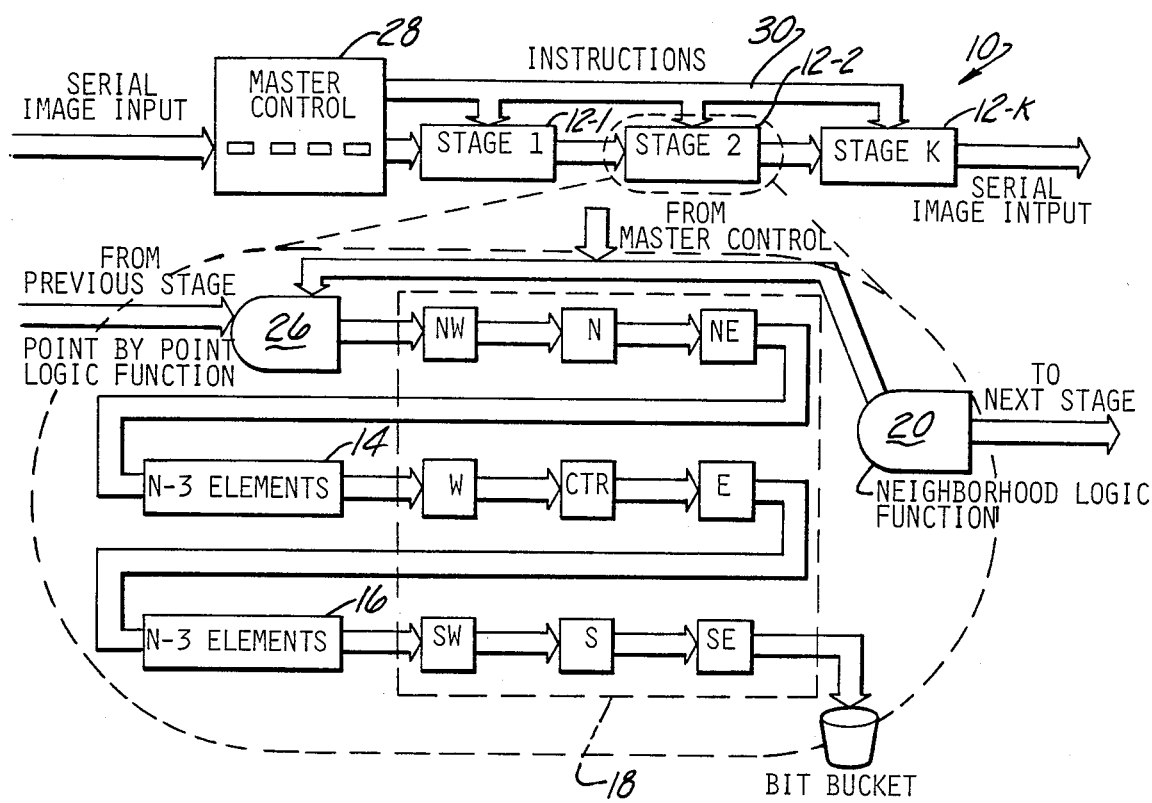
FIG. 1 is a schematic diagram illustrating a serial neighborhood processing system employing a pipeline of transformation stages.
FIG. 2 is a view helpful in explaining the nature of a neighborhood transformation.

FIG. 1 illustrates an example of an image processing system 10 in which the present invention finds particular utility. System 10 consists of one or more substantially identical serial neighborhood processing stages 12-1 to 12-K. In FIG. 1, the stages are connected together in a pipeline such that the output of one stage is connected to the input of the subsequent stage in the pipeline. Connecting the stages together in a pipeline offers several advantages but the present invention may be used as part of a single stage system, if desired. In the disclosed pipeline embodiment, the stages are each connected to a common clock and each stage in the pipeline forms a single neighborhood transformation of an entire image matrix. The image matrix is entered in the form of data consisting of a serial stream of 8-bit pixels in a sequential raster scan line format and progresses through the pipeline of stages at a constant rate. If each pixel is represented by 8-bits (as is the case herein), each pixel value can range from 0 to 255. The pixel values may represent a variety of different characteristics of points in the image such as brightness, transmittance, etc.

Following the initial latentcy to fill the pipeline, each image matrix is analyzed at the same rate as it is entered. Memory devices within each stage are provided to hold two contiguous scan lines. In the embodiment shown in FIG. 1, shift registers 14 and 16 are employed as line delay buffers which cooperate with the window registers to perform this function. Preferably, however, the window registers are sequentially loaded from a random access memory in each stage as disclosed in U.S. Pat. No. 4,395,700 to McCubbrey et al, which is hereby incorporated by reference.

An array 18 of neighborhood window registers holds nine neighborhood pixels which constitute a 3×3 window. In FIG. 1 each window register is labeled as points on a compass referencing a center pixel (CNTR) in the array. The array serves as a neighborhood extraction means to sequentially access substantially all of the neighborhoods of pixel values in the image matrix. The window registers are connected to a programmable neighborhood logic module 20. The present invention is directed towards a new construction for module 20 and, as will appear, consists of various logic elements for performing programmed operations on each accessed neighborhood. The details of the module construction will be described later herein. Suffice it to say that the general purpose of module 20 is to analyze the values of the pixels in array 18 and, based on the analysis, generate an output of a given value. In general, the output will either be the same value as the center pixel in array 18 or it will be transformed into another value based upon the analysis of the values of the center pixel and its relationship with its eight neighbors. The output of module 20 is referred to as the transformation output and it is computed within the data transfer clock period, allowing the output of the stage to appear at the same rate as the input. At each discrete time interval a new pixel is clocked into the stage and the old pixels are shifted one position to thereby access a different neighborhood via window register array 18.

Figure 3:
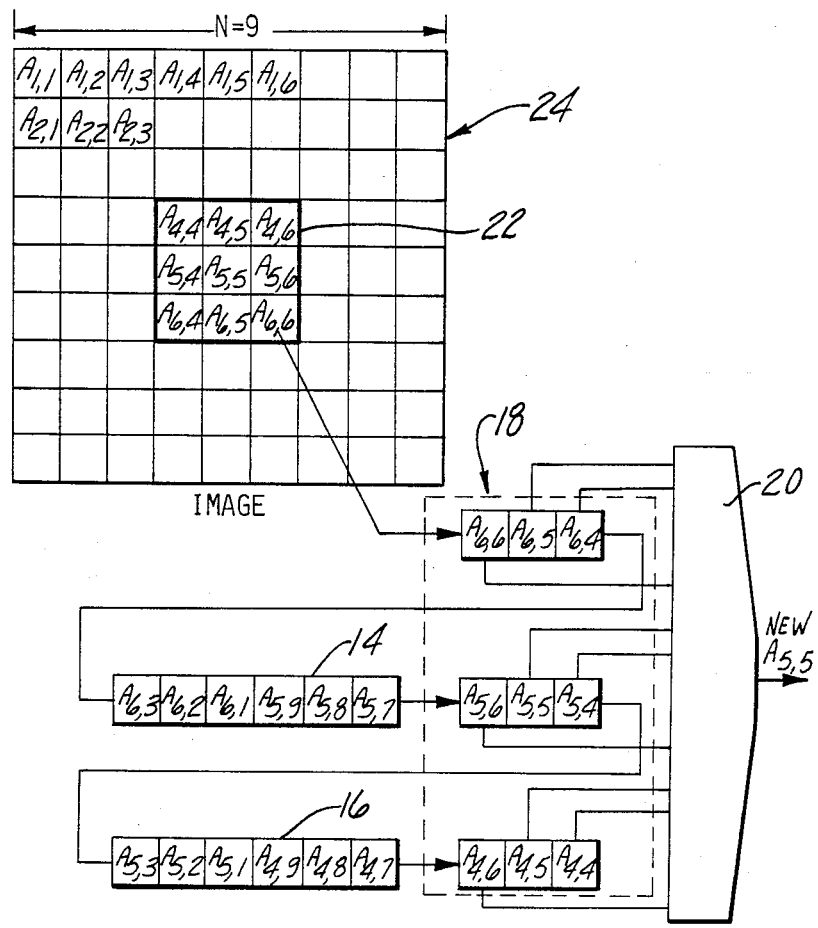
FIG. 3 is a schematic view illustrating the manner in which a neighborhood of pixels can be accessed from the image matrix for processing.

FIG. 2 pictorally illustrates this transformation process. Matrix A represents the image matrix entering the stage and Matrix B represents the transformed matrix output by the stage. To visualize the transformation process, imagine a 3×3 window 22 moving across an image matrix 24 as shown in FIG. 3. The window register array 18 is shown in FIG. 3 after the pixel $A_{6,6}$ has been entered into the stage. The transformation logic module 20 computes the transformed value of the pixel in the center window as a function of its surrounding neighbors. The transformed value of the center pixel is then output from the stage and connected to the input of the next stage in the pipeline or recirculated back to the input of the stage to perform other transformations if desired. From this example, it can be realized that the latentcy of a stage is equal to N+2 time steps, N being the line length of matrix 24.

Referring back to FIG. 1, each stage further includes point-by-point logic circuitry 26 for performing operations which do not necessarily depend upon the values of the neighboring pixels. For example, circuitry 26 may perform such things as scaling, ANDing or ORing together selected bits in the pixels, or performing other Boolean functions. Point-by-point logic circuitry 26 and transformation logic module 20 are programmable from a central or master controller 28. Suitable provision is made for addressing and programming each stage. This can be accomplished in a variety of manners and is schematically illustrated by the bus 30 in FIG. 1. Further details of the construction of the image processing system 10 are disclosed in the aforementioned U.S. Pat. No. 4,395,700 as well as in U.S. Pat. No. 4,167,728 and U.S. Pat. No. 4,301,443 which are also hereby incorporated by reference.

Figure 4:
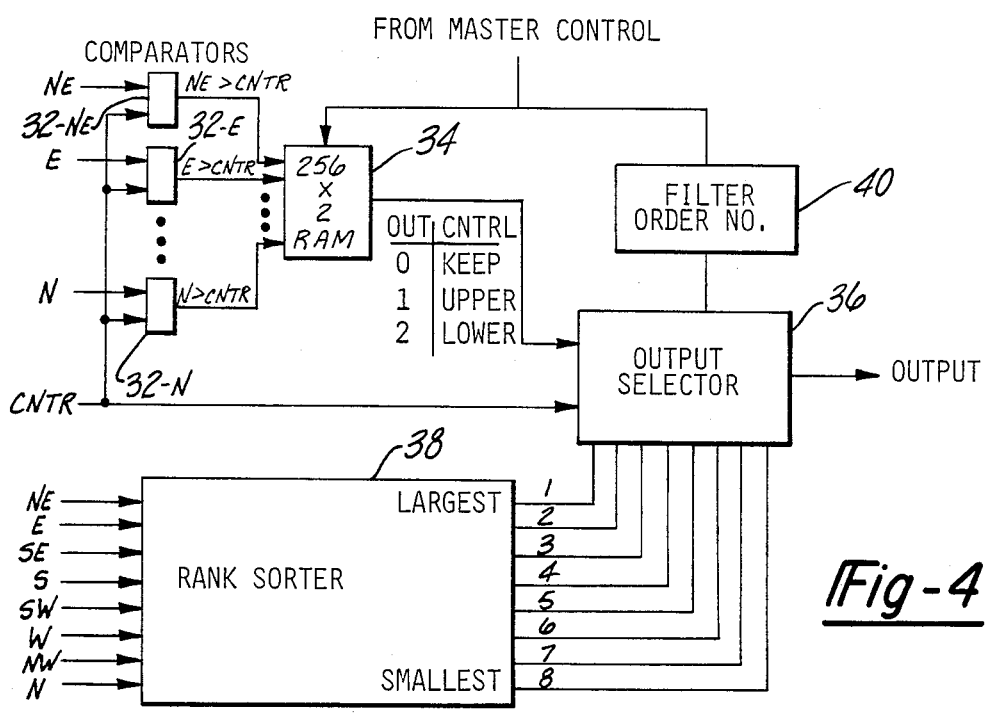
FIG. 4 is a schematic diagram of logic circuitry for a neighborhood transformation stage made in accordance with the preferred embodiment of this invention.

FIG. 4 illustrates an improved construction for the transformation logic module 20. This construction is especially useful for performing filtering operations on the image data. In an image processing system such as system 10 it may only be necessary to perform image filtering operations in a limited number of stages and, therefore, it is not necessary that all of the transformation modules include the ability to perform such functions. On the other hand, it may be economically feasible to include in each stage this filtering capability, especially if the stages are implemented as mass-produced integrated circuits.

Means are provided for comparing the values of neighboring pixels with the value of a given pixel in a group and providing a first output as a function of the comparison. In FIG. 4, this is accomplished by way of a series of eight comparators 32, each of which is respectively coupled to one of the eight neighboring window registers in array 18. Each of the comparators also includes another input which is coupled to the window register containing the center pixel. Each of the comparators is adapted to make a comparison between the value of its associated neighboring pixel with the value of a center pixel. For example, the comparator 32-NE compares the value of the pixel contained in window register NE with the value of the pixel contained in the center register CNTR. If the northeast (NE) neighbor is greater than the center, then the output of comparator 32-NE will be a given value, for example, the value of 1. On the other hand, if the northeast neighbor is less than or equal to the center, the comparator's output will be 0.

The outputs of the eight comparators are combined together to form a vector for addressing a random access memory 34 which serves as a look-up table. Since the combined outputs of comparators 32 consist of 8-bits, the address vector is capable of addressing 256 different memory locations. If, for example, only the northeast (NE) and southwest (SW) pixel is greater than the center (CNTR) then the address vector would be 10001000 expressed in binary notation, assuming that the comparators are arranged so that the northeast comparator is in the most significant bit position and the other comparators are arranged in descending order moving clockwise with reference to their associated window registers as shown in FIG. 1.

The memory locations in RAM 34 are programmed via master controller 28. Thus, the user can define the types of filtering operations to be performed in each stage. The memory location addressed by the vector from comparators 32 is used as a control signal for an output selector 36. In this embodiment, the values stored in RAM 34, and therefore capable of being read out of it, are the values 0, 1 or 2 as set forth in the chart adjacent RAM 34 in FIG. 4. A value of 0 (keep) indicates that there is to be no transformation of the center pixel value. As will be explained, a RAM 34 output value of 1 (upper) is used to select a first subset of outputs from rank sorter 38. A RAM 34 output of 2 (lower) is used to select a second subset of outputs from rank sorter 38. Suitable means 40 are provided for providing another input to selector 36 to select which output in the selected subset (upper or lower) is to be used as the transformation output of the stage. This means 40 is shown in FIG. 4 with the label "Filter Order No." and can take the form of any suitable storage device or register which is also preferably programmed from master controller 28.

Rank sorter 38 is any suitable device designed to compare the values of the neighboring pixels with each other and provide a series of outputs in a predetermined order according to the relative positions or ranks of the values of the neighboring pixels. Rank sorter 38 may take the form of a conventional sequential circuit, a shuffle network or a systolic array. The outputs of rank sorter 38 are shown in FIG. 4 with labels bearing the number 1–8. Output number 1 contains the largest pixel value of the neighboring pixels. Output number 2 contains the second highest pixel value and so forth down to output number 8 which contains the smallest pixel value of the neighboring pixels.

Selector means 36 selects as its output the value of the center pixel (CNTR) or the value of a neighboring pixel ranked in a given position as a function of the output of the comparators 32 and, preferably, also as a function of the output from means 40. The present invention is particularly suited for performing filtering operations utilizing various versions of the so called "donut" filters. These filters are a set of cellular transformations used on images for the purpose of removing isolated, small clusters of noise. The noise often appears as abrupt changes in pixel values when compared with the pixel values of a given set of other pixels in the matrix. This other set is preferably the immediately surrounding pixels in the image. The donut filtering operation is used to successively analyze each pixel in the matrix and will transform it into a new value if it is determined that the pixel value is either too large or too small in comparison with the neighboring pixel values. The simplest of the donut filters is called an order 0 donut filter. It is made of two parts: a spike remover and a hole remover. The spike remover proceeds as follows: for each pixel consider its 3×3 neighborhood and, if the center pixel is greater than all of its neighborhoods, then the center is replaced with a value equal to its largest neighbor; otherwise its value is kept unchanged. This has the effect of removing isolated spikes and replacing them with a value which is already in the image, as opposed to creating a value by averaging other values. The hole remover is similar, replacing the center pixel by the smallest neighbor's value if the center is smaller than all of its neighbors.

Higher order donut filters operate in a similar manner. However, they operate to ignore one or more of the neighboring pixel values when determining whether the center pixel value should be changed or transformed.

Some specific examples may help in understanding the operation of this invention. Assume, for example, that a neighborhood has been accessed in array 18 and it has the values listed in the following TABLE I:

TABLE I

| NW = 200 | N = 212 | NE = 210 |
| W = 198 | CNTR = 50 | E = 213 |
| SW = 192 | S = 140 | SE = 152 |

Assume further that it is desired to form a donut 0 filtering operation, i.e. if the center is greater than all of its neighbors then transform it to a value corresponding to the highest neighbor or if the center is less than all of its neighbors, then transform the center to a value corresponding with the smallest neighbor. Otherwise, the center is left unchanged in value. In such an instance, master controller 28 would program RAM 34 (FIG. 4) so that memory location 0 had the value of 1, memory location 255 has the value of 2 and the remaining locations have values of 0. Obviously, if it was desired to only remove spikes from the image, then the RAM location 255 would be loaded with the value of 0 (no transformation) instead of 2. Master controller 28 would also program the filter order number means 40 so that its output would be interpreted by selector 36 in conjunction with the output of RAM 34 to select either position of 1 or 8 from rank sorter 38 as the transformation output if the center is to be changed in value.

In this example, comparators 32 would provide an address vector of 11111111 or 255 since each of the neighbors is greater than the center. Thus, the output of RAM 34 would be the value of 2. This indicates to the selector 36 that it is to select the lower subset of outputs from rank sorter 38. Output number 8 would be associated with the southern neighbor S since its value of 140 is the smallest in this example. The filter order number means 40 provides decisional information to selector 36 to select rank sorter output 8 as the transformation output. Thus, the order 0 donut filter will operate to replace the center pixel value of 50 with that of 140. This construction also would operate to remove spikes in the image without requiring reprogramming. For example, if the center pixel had a value of 243 instead of 50 in the neighborhood of TABLE I; then the output of comparators 32 would be 0 and the output of RAM 34 would be 1. This output together with the information from filter order means 40 causes selector 36 to select the upper subset and largest pixel position (1) from rank sorter 38 as the transformation output. Consequently, the center value of 243 would be transformed to the value of 213 which is the largest pixel value of the neighbors.

The following TABLE II will be used to explain the operation of a higher order donut filter:

TABLE II

| NW = 122 | N = 110 | NE = 156 |
| W = 132 | CNTR = 240 | E = 247 |
| SW = 123 | S = 125 | SE = 146 |

An order 1 donut filter will be used in this second example. The order 1 donut filter will remove a pulse of two pixels and it will shorten single-pixel ridges (and valleys) by removing the ends. In other words, if the center is greater than seven or eight of its neighbors, then the neighbor value of rank two is selected as the transformation output. If the center is not greater than seven or eight neighbors, then the neighbor value of rank seven is substituted as the transformation output.

With reference to FIG. 4, the master controller 28 would load the value of 1 in all RAM 34 memory locations capable of being addressed when the center is greater than seven or eight of its neighbors. For example, a vector of 01000000 would indicate that the center is greater than all of its neighbors except the easterly one (E). This RAM memory location would be loaded with the value of 1. Conversely, all RAM memory locations addressable when the center is less than seven or eight of its neighbors are loaded with the value of 2. For example, an address vector of 11111110 would indicate that the center is less than all neighbors except the northerly one. Consequently, this RAM memory location would be loaded with the value of 2. As noted above, the output of RAM 34, if it is 1 or 2 indicates that a transformation is to be made. The output from filter order means 40 determines which neighbor in the subset (upper or lower) is to become the transformation output value. In this example, means 40 provides sufficient information to indicate that position 2 of rank sorter 38 will be selected if the output from RAM 34 is the value of 1 (upper) and that position 7 will be selected if the RAM output is 2. In the example of TABLE II, the center pixel value (240) is greater than all of its neighbors except the easterly one having a value of 247. The output of RAM 34 would therefore be 1 and the selector device 36 using the output of means 40 would select rank 2 as the transformation output. A review of TABLE II indicates that the NE neighbor is the seventh highest and therefore the transformation output would be the value of 156. If, on the other hand, the center value was 112 instead of 240, then the transformation would be the value of 122 since it has been ranked by sorter 38 into position 7 and the center is less than seven or eight of its neighbors.

The improved image processing stage construction just described enables the user to implement a wide variety of similar filtering operations by simple reprogramming RAM 34 and filter order means 40. If, or course, the same filtering operation is to be performed by the stage at all times then the decisional data can be fixed. Various other modifications will become apparent to the skilled practitioner upon a study of the specification, drawings and following claims.

I claim:

1. In a neighborhood transformation stage having neighborhood extraction means for sequentially accessing a group of pixel values in an image matrix, the improvement comprising:
   first means for comparing the values of neighboring pixels with the value of a given pixel in the group and providing a first output as a function of the comparison;
   sorting means for comparing the values of the neighboring pixels with each other and providing a series of outputs in a predetermined order according to relative positions of the values of the neighboring pixels; and
   selector means for selecting as its output the value of the given pixel or the value of a neighboring pixel ranked in a given position as a function of the first output from the first means.

2. The improvement of claim 1 wherein said first means comprises:
   a series of comparators adapted to compare the values of the neighboring pixels with the value of said given pixel, outputs from each comparator being combined to generate an address vector;
   memory means having a plurality of storage locations addressable by said address vector for providing an output value containing the contents of the storage location addressed by said address vector; and
   means for coupling the contents of the addressed storage location of the memory means to an input of the selector means.

3. The improvement of claim 2 wherein said sorting means is adapted to arrange its outputs into a plurality of subsets; and wherein the improvement further comprises:
   storage means for providing an output to the selector means, said output being used by the selector means to select a given output in each subset of the sorting means.

4. The improvement of claim 3 wherein said memory means and storage means are programmable devices, each including means coupled to a master controller for programming the memory means and storage means.

5. The improvement of claim 1 wherein said group of pixel values is a 3×3 array in the image matrix and said given pixel is the center pixel in the array.

6. The improvement of claim 3 wherein the sorting means has eight outputs ranked from the largest neighboring pixel value to the smallest pixel value, and wherein the four largest outputs define an upper subset and the four lowest outputs define a lower subset; and
   wherein the output from the memory means is used to select the upper or lower subset, with the output from the storage means being used to select a particular output in each subset.

7. Apparatus for performing filtering operations on an image matrix represented by a serial stream of multi-bit pixel values, said apparatus comprising:
   a master controller;
   a neighborhood transformation stage coupled to the controller, said stage having an array of temporary storage devices for sequentially accessing a neighborhood of pixels in the image matrix, said neighborhood consisting of a center pixel value and its surrounding neighbors in the image matrix;
   said stage including a transformation logic module connected to the neighborhood storage devices for generating a transformation output for each accessed neighborhood, said transformation logic module including:
   a series of comparators, each comparator having one input connected to the storage device containing the center pixel and another input connected to a storage device containing one of the neighbors, said comparators having outputs which are combined together to form a multi-bit address vector;
   random access memory means having a plurality of programmable locations addressable by the vector generated by the outputs of the comparators, the contents of the addressed location providing an output of the memory means, means for connecting the memory means to the master controller for programming said locations;
   sorting means having inputs connected to the storage devices containing the pixel values of the neighbors, said sorting means being operative to compare the values of the neighbors with each other and provide a series of outputs ranked in descending order according to the relative values of the neighbor pixels, a first subset of outputs containing the largest pixel values and a second subset containing the smallest pixel values of the neighbor pixels;
   programmable storage means connected to the master controller for providing an output for selecting a given output in each subset of the sorting means;
   selector means having inputs connected to said storage device containing the center pixel in the neighborhood and inputs connected to the ranked outputs of the sorting means, said selector means further including means for receiving the outputs from said memory means and said storage means, whereby said selector means is adapted to select as its output the value of the center pixel or one of the outputs from the sorting means as a function of the outputs from the memory and storage means; and whereby said stage can be used to perform a wide variety of filtering operations on the image matrix by appropriately programming the memory means and storage means.

8. The apparatus of claim 7 wherein the storage devices are arranged in a 3×3 array.

9. The apparatus of claim 7 wherein the output of the selector means is coupled to an input of a substantially identical stage.

10. The apparatus of claim 7 wherein said memory means is a 256×2 look-up table whose locations contain values of 0, 1 or 2; the value of 0 causing the selector means to keep the value of the center pixel, the value of 1 causing the selector means to select the first subset from the sorting means, and the value of 2 causing the selector means to select the second subset from the sorting means.

* * * * *